US012614414B2

(12) United States Patent
Tsukahara

(10) Patent No.: US 12,614,414 B2
(45) Date of Patent: Apr. 28, 2026

(54) DRIVE RECORDER, METHOD OF OPERATING DRIVE RECORDER, AND RECORDING MEDIUM STORING INSTRUCTIONS FOR OPERATING SAME

(71) Applicant: NEC Corporation, Tokyo (JP)

(72) Inventor: Hidenori Tsukahara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/439,948

(22) Filed: Feb. 13, 2024

(65) Prior Publication Data

US 2024/0185644 A1 Jun. 6, 2024

Related U.S. Application Data

(63) Continuation of application No. 17/731,670, filed on Apr. 28, 2022, now Pat. No. 11,935,336, which is a continuation of application No. 16/334,545, filed as application No. PCT/JP2017/026070 on Jul. 19, 2017, now Pat. No. 11,348,379.

(30) Foreign Application Priority Data

Sep. 28, 2016 (JP) ................................. 2016-189863

(51) Int. Cl.
| | |
|---|---|
| *G07C 5/00* | (2006.01) |
| *G06V 20/56* | (2022.01) |
| *G07C 5/08* | (2006.01) |

(52) U.S. Cl.
CPC ............. *G07C 5/008* (2013.01); *G06V 20/56* (2022.01); *G07C 5/085* (2013.01)

(58) Field of Classification Search
CPC ......... G07C 5/008; G07C 5/085; G06V 20/56
See application file for complete search history.

(56) References Cited

U.S. PATENT DOCUMENTS

| | | | |
|---|---|---|---|
| 2004/0019192 A1 | 1/2004 | Kennedy | |
| 2007/0216771 A1 | 9/2007 | Kumar | |
| 2010/0245072 A1* | 9/2010 | Harel | ............... G08B 13/19695 |
| | | | 340/463 |

(Continued)

FOREIGN PATENT DOCUMENTS

| | | |
|---|---|---|
| JP | 2003-065695 A | 3/2003 |
| JP | 2016-092531 A | 5/2016 |
| JP | 2016-119602 A | 6/2016 |

OTHER PUBLICATIONS

English Translation of CN204010282U Title: Based On The Vehicle State Information Transmitting Device Of The Intelligent Terminal And The Mobile Terminal Author: Huang, Ji-hong Date: Dec. 10, 2014 (Year: 2014).*

(Continued)

*Primary Examiner* — Steven Vu Nguyen
(74) *Attorney, Agent, or Firm* — Sughrue Mion, PLLC

(57) ABSTRACT

A drive recorder to be mounted on a vehicle includes an acquisition unit, a recording unit, a communication unit, and a control unit. The acquisition unit acquires data representing driving condition. The recording unit records the acquired data. The communication unit transmits the acquired data to the outside. The control unit controls the quality of the data to be transmitted based on the information received from the outside.

15 Claims, 16 Drawing Sheets

(56) References Cited

U.S. PATENT DOCUMENTS

2010/0245582 A1* 9/2010 Harel ............... G08B 13/19621
                                              348/143
2016/0093121 A1   3/2016 Singh ..................... H04W 4/90
                                              701/32.3

OTHER PUBLICATIONS

English Translation of JP2007199791A Title: Drive Recorder Author: Tonokawa et al. Date: Aug. 9, 2007 (Year: 2007).*

English Translation of JP2016119602A Title: Drive Recorder and Drive Recorder System Author: Kuwabara et al. Date: Jun. 30, 2016 (Year: 2016).*

International Search Report for PCT/JP2017/026070 dated Sep. 19, 2017 [PCT/ISA/210].

Communication dated Sep. 9, 2019 from the European Patent Office in application No. 17855378.0.

English Translation of Publication No. JP 2016119602 A Author: Kuwabara, Yasuro Date: Jun. 30, 2015 Title: Drive Recorder and Driver Recorder System (Year: 2016).

English Translation of Publication No. JP2016092531A Author: Hoshiya et al. Title: Image Transmission Device, Image Acquisition Method, and Image Acquisition Program Date: May 23, 2016 (Year: 2016).

* cited by examiner

<u>100</u>  DRIVE RECORDER

| FILE NAME | TIME-OF-DAY INFORMATION | POSITION INFORMATION | VIDEO DATA | SENSED DATA | ... | SENSED DATA |
|---|---|---|---|---|---|---|
| 1631 | 1632 | 1633 | 1634 | 1635-1 | | 1635-n |

FIG. 6

| COMMAND NAME | FUNCTION | COMMAND NUMBER | PARAMETER 1 |
|---|---|---|---|
| ON COMMAND | HIGH QUALITY ON SETTING | 1 | VEHICLE CODE OR NULL |
| OFF COMMAND | HIGH QUALITY OFF SETTING | 2 | VEHICLE CODE OR NULL |

FIG. 8

| COMMAND NAME | FUNCTION | COMMAND NUMBER | PARAMETER 1 | PARAMETER 2 |
|---|---|---|---|---|
| ON COMMAND | HIGH QUALITY ON SETTING | 1 | VEHICLE CODE OR NULL | START TIME : END TIME |
| OFF COMMAND | HIGH QUALITY OFF SETTING | 2 | VEHICLE CODE OR NULL | |

FIG. 10

| COMMAND NAME | FUNCTION | COMMAND NUMBER | PARAMETER 1 | PARAMETER 2 |
|---|---|---|---|---|
| ON COMMAND | HIGH QUALITY ON SETTING | 1 | VEHICLE CODE OR NULL | AREA INFORMATION |
| OFF COMMAND | HIGH QUALITY OFF SETTING | 2 | VEHICLE CODE OR NULL | |

FIG. 12

| COMMAND NAME | FUNCTION | COMMAND NUMBER | PARAMETER 1 | PARAMETER 2 |
|---|---|---|---|---|
| ON COMMAND | HIGH QUALITY ON SETTING | 1 | VEHICLE CODE OR NULL | FEATURE INFORMATION |
| OFF COMMAND | HIGH QUALITY OFF SETTING | 2 | VEHICLE CODE OR NULL | |

FIG. 14

| COMMAND NAME | FUNCTION | COMMAND NUMBER | PARAMETER 1 | PARAMETER 2 | PARAMETER 3 |
|---|---|---|---|---|---|
| SEARCH COMMAND | SEARCH | 1 | VEHICLE CODE OR NULL | SEARCH CONDITION | SEARCH TARGET |

DRIVE RECORDER, METHOD OF OPERATING DRIVE RECORDER, AND RECORDING MEDIUM STORING INSTRUCTIONS FOR OPERATING SAME

CROSS-REFERENCE TO RELATED APPLICATIONS

The present application is a continuation application of U.S. patent application Ser. No. 17/731,670 filed on Apr. 28, 2022, which is a continuation application of U.S. patent application Ser. No. 16/334,545 filed on Mar. 19, 2019, which issued as U.S. Pat. No. 11,348,379, which is a National Stage Entry of international application PCT/JP2017/026070 filed on Jul. 19, 2017, which claims the benefit of priority from Japanese Patent Application 2016-189863 filed on Sep. 28, 2016, the disclosures of all of which are incorporated in their entirety by reference herein.

TECHNICAL FIELD

The present invention relates to a drive recorder, a driving condition management method, and a program.

BACKGROUND ART

A drive recorder, having been proposed and put into practical use, is configured to record data representing driving condition of a vehicle including images in the front direction of the vehicle captured by a camera mounted on the vehicle such as an automobile and data detected by various sensors such as an acceleration sensor, and transmit them to the outside.

For example, Patent Literature 1 describes a drive recorder capable of storing high-quality images in a storage unit and transmitting low-quality images to the outside. In more detail, Patent Literature 1 describes a drive recorder including a means for generating an image that is captured by a camera mounted on a vehicle and in which the image quality is lowered, a means for storing an image that is captured by the camera and has higher image quality than the low-quality image, and a means for transmitting the low-quality image in a particular driving condition (such as sudden acceleration) to the outside by a communication unit.

Patent Literature 1: JP 2016-119602 A

SUMMARY

In the drive recorder of Patent Literature 1, the quality of images to be transmitted to the outside is fixed to low quality, under the consideration that no hindrance occurs although the quality of images for checking the driving condition of the vehicle is low, to thereby improve the transmission reliability and reduce the communication cost. However, the importance of images is not constant. Some images are important while others are not. Therefore, in the configuration in which the quality of images transmitted to the outside is fixed, it is difficult to achieve both reduction of the communication cost and effective use of the images. The same is true for data representing the driving condition detected by the sensors such as an acceleration sensor.

An exemplary object of the present invention is to provide a drive recorder that solves the above-described problem, that is, a problem that in a configuration in which the quality of data representing the driving condition to be transmitted to the outside is fixed, it is difficult to achieve both reduction of the communication cost and effective use of the data representing the driving condition.

A drive recorder according to an exemplary aspect of the present invention is a drive recorder to be mounted on a vehicle. The drive recorder includes an acquisition unit that acquires data representing driving condition, a recording unit that records the acquired data, a communication unit that transmits the acquired data to the outside, and a control unit that controls the quality of the data to be transmitted based on information received from the outside.

A driving condition management method according to another exemplary aspect of the present invention is a driving condition management method to be executed by a drive recorder to be mounted on a vehicle. The method includes acquiring data representing driving condition, recording the acquired data, transmitting the acquired data to the outside, and controlling the quality of the data to be transmitted based on information received from the outside.

A program according to another exemplary aspect of the present invention is a program for causing a computer, to be mounted on a vehicle, to function as an acquisition unit that acquires data representing driving condition, a recording unit that records the acquired data, a communication unit that transmits the acquired data to the outside, and a control unit that controls the quality of the data to be transmitted based on information received from the outside.

With the configuration described above, the present invention enables achievement of both reduction of the communication cost and effective use of data representing the driving condition.

BRIEF DESCRIPTION OF THE DRAWINGS

FIG. 4 illustrates an exemplary format of a file to be saved in the driving condition saving unit of the drive recorder according to the first exemplary embodiment of the present invention.

FIG. 6 illustrates an exemplary format of a command used in the first exemplary embodiment of the present invention.

FIG. 8 illustrates an exemplary format of a command used in a second exemplary embodiment of the present invention.

FIG. 10 illustrates an exemplary format of a command used in a third exemplary embodiment of the present invention.

FIG. 12 illustrates an exemplary format of a command used in a fourth exemplary embodiment of the present invention.

FIG. 14 illustrates an exemplary format of a command used in a fifth exemplary embodiment of the present invention.

EXEMPLARY EMBODIMENTS

Next, exemplary embodiments of the present invention will be described in detail with reference to the drawings.

First Exemplary Embodiment

Figure 1:
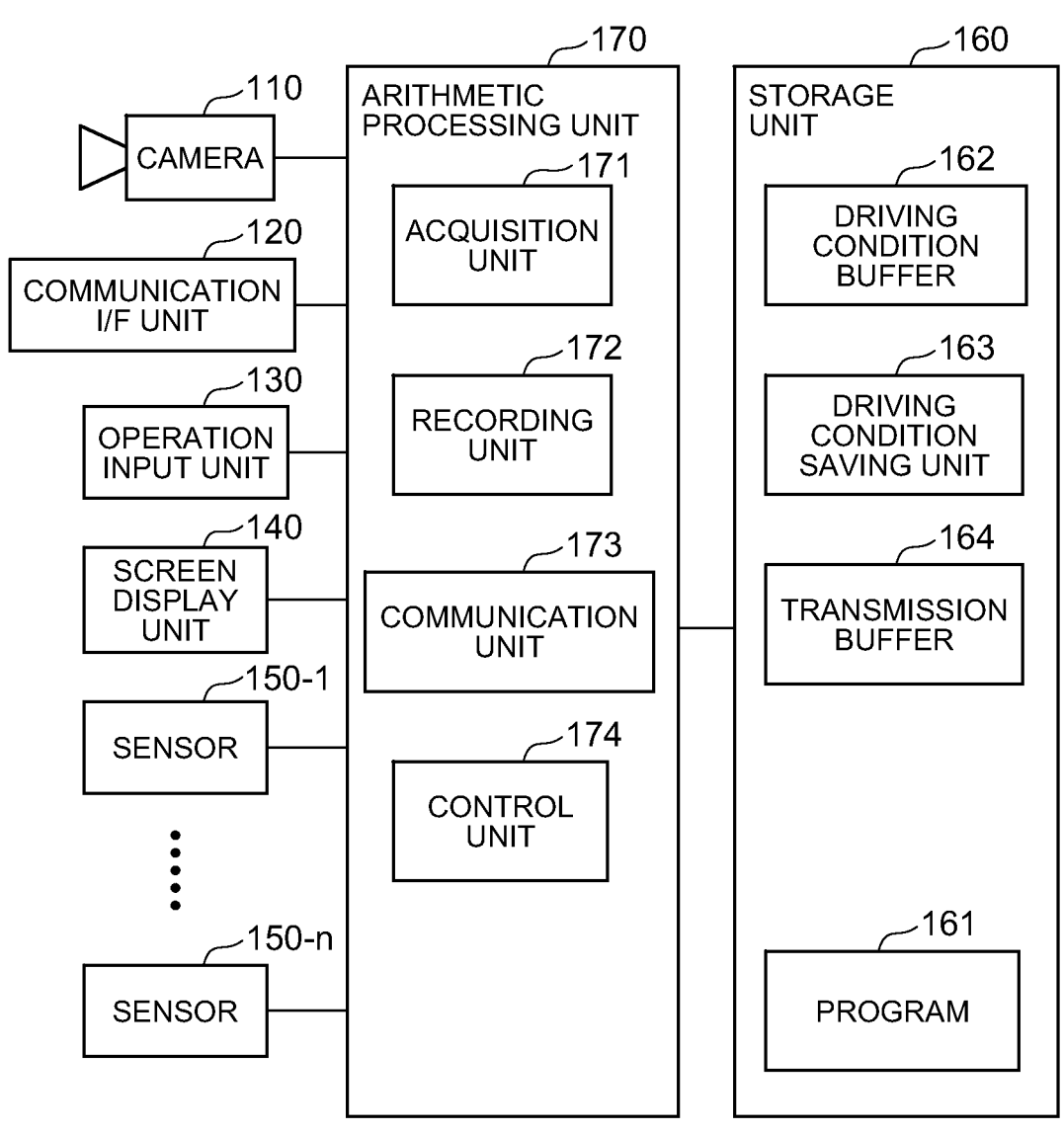
FIG. 1 is a block diagram of a drive recorder according to a first exemplary embodiment of the present invention.

FIG. 1 is a block diagram of a drive recorder 100 according to a first exemplary embodiment of the present invention. Referring to FIG. 1, the drive recorder 100 according to the present embodiment is mounted on a vehicle such as an automobile, and has a function of recording driving condition of the vehicle. The drive recorder 100 includes a camera 110, a communication interface unit (communication I/F unit) 120, an operation input unit 130, a screen display unit 140, sensors 150-1 to 150-n, a storage unit 160, and an arithmetic processing unit 170.

The camera 110 has a function of capturing a video of the front side in the traveling direction of the vehicle with high quality. Here, high quality means that the resolution is high and the frame rate is high, for example. For example, the camera 110 has an ability of capturing high-quality images conforming to full HD standard or higher, at a frame rate of 30 frames or more per second. However, the camera is not limited thereto. As the camera 110, a charge-coupled device (CCD) camera or a complementary MOS (CMOS) camera may be used, for example. The camera 110 is a type of a sensor for sensing data representing the driving condition.

The communication I/F unit 120 is configured of a dedicated data communication circuit, and has a function of performing data communication with an external server device by short-distance wireless communication such as Wi-Fi or Bluetooth (registered trademark), for example. Alternatively, the communication I/F unit 120 has a function of performing data communication with an external server device via a mobile communication network such as 3G or LTE, for example.

The operation input unit 130 is configured of an operation input device such as operation buttons, and has a function of detecting an operation by an operator and outputting it to the arithmetic processing unit 170. The screen display unit 140 is configured of a screen display device such as an LCD or a PDP, and has a function of displaying, on a screen, various types of information such as a monitor screen of the camera 110, according to an instruction from the arithmetic processing unit 170.

Each of the sensors 150-1 to 150-n has a function of sensing data representing the driving condition with high quality. Here, high quality means that resolution is high and the number of times of measurement per unit time is large, for example. The sensors 150-1 to 150-n output sensed data to the arithmetic processing unit 170.

The sensors 150-1 to 150-n include an acceleration sensor, a vehicle speed sensor, a global positioning system (GPS) sensor, a time-of-day sensor (clock), an illuminance sensor, a weather sensor, a biological sensor, and the like, for example. The acceleration sensor detects acceleration in two axes of front and rear and left and right of the vehicle. The vehicle speed sensor detects the speed of the vehicle. The GPS sensor detects the longitude and the latitude representing the current position of the vehicle based on signals received from GPS satellites. The time-of-day sensor detects the current time of day. The Illuminance sensor detects the illuminance around the vehicle. The weather sensor detects weather conditions at the point where the vehicle travels. The weather conditions include one or a combination of temperature, humidity, wind speed, weather (sunny, rain, snow, cloudy, etc.), and the like. The weather sensor may be one that senses the weather conditions by itself, or one that is connected with a server device that provides the weather conditions, and acquires the weather conditions of the point where the own vehicle is traveling through a network. The point where the own vehicle is traveling can be acquired from a car navigation system mounted on the vehicle, for example.

The storage unit 160 is configured of a storage device such as a hard disk, a memory, or the like, and has a function of storing processing information, a storage area, and a program 161 that are necessary for various types of processing performed in the arithmetic processing unit 170. The program 161 is a program for implementing various processing units by being read into the arithmetic processing unit 170 and executed. The program 161 is read in advance from an external device (not illustrated) or a storage medium (not illustrated) via a data input/output function such as the communication I/F unit 120, and is saved in the storage unit 160. The main processing information and the storage area stored in the storage unit 160 include a driving condition buffer 162, a driving condition saving unit 163, and a transmission buffer 164.

The driving condition buffer 162 is a storage area for recording data sensed by the camera 110 and the sensors 150-1 to 150-n for a past predetermined amount or a past predetermined period. For example, in the driving condition buffer 162, writing of data is started from the head of the buffer area, and when the data is written up to the end of the buffer area, data is rewritten from the head again.

Figure 2:
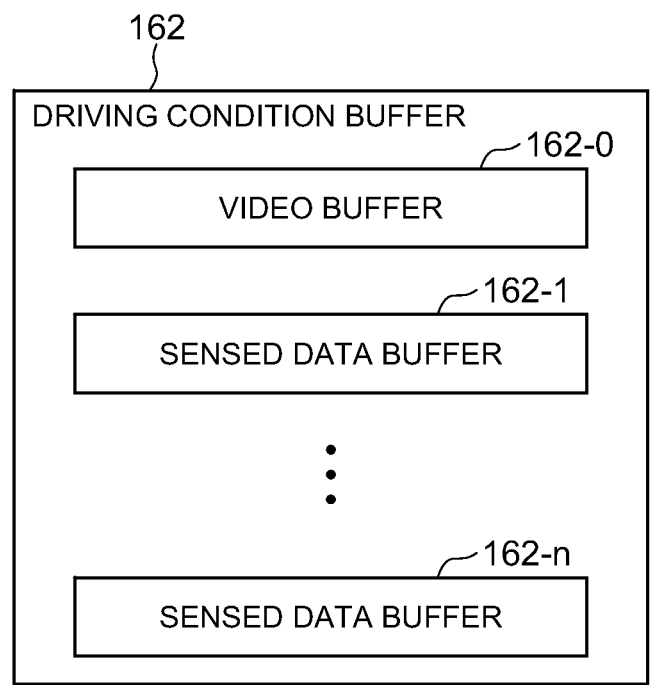
FIG. 2 illustrates an exemplary configuration of a driving condition buffer of the drive recorder according to the first exemplary embodiment of the present invention.

FIG. 2 illustrates an exemplary configuration of the driving condition buffer 162. The driving condition buffer 162 of this example includes a video buffer 162-0 to recording a video obtained by being imaged by the camera 110, and a sensed data buffers 162-1 to 162-n for recording data sensed by the sensors 150-1 to 150-n. In each of the buffers 162-0 to 162-n, writing of data is started from the head of the buffer area, and when the data is written up to the end of the buffer area, data is rewritten from the head again. Further, in each of the buffers 162-0 to 162-n, time-of-day information representing the time of day when the sensed data is acquired and position information representing the acquired place are recorded in associated with the sensed data. For example, in the video buffer 162-0, time-of-day information and position information are recorded in association with each other for one frame or the predetermined number of frames of the video. Further, in the sensed data buffers 162-1 to 162-n, time-of-day information and position information are recorded in association with each other for sensed data of one measurement. Here, the position information represents the position (for example, latitude and longitude) where the vehicle exists.

The driving condition saving unit 163 is a storage area for storing the driving condition data partially extracted from the driving condition buffer 162. The driving condition data recorded in the driving condition saving unit 163 is configured not to be overwritten like data recorded in the driving condition buffer 162, even though the data becomes old.

Figure 3:
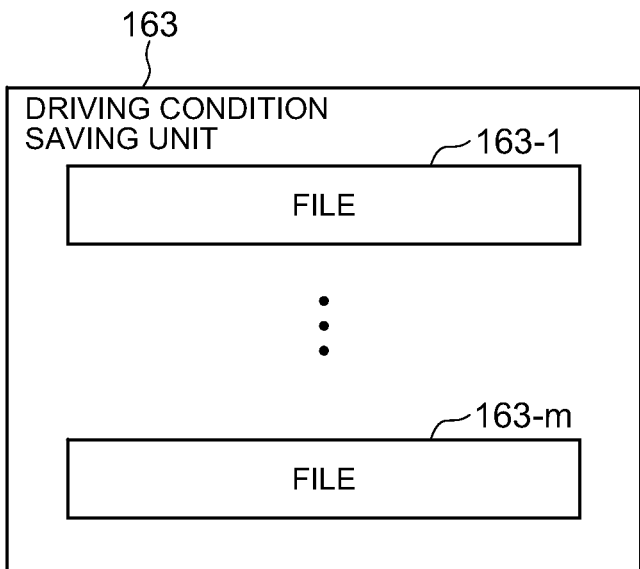
FIG. 3 illustrates an exemplary configuration of a driving condition saving unit of the drive recorder according to the first exemplary embodiment of the present invention.

FIG. 3 illustrates an exemplary configuration of the driving condition storage unit 163. The driving condition saving unit 163 of this example is configured to store files 163-1 to 163-m including driving condition data extracted from a part of the driving condition buffer 162.

FIG. 4 illustrates an exemplary configuration a file 163-i (i=1 to m). The file 163-i of this example is configured of a file name 1631, time-of-day information 1632, position information 1633, video data 1634, and sensed data 1635-1 to 1635-n. The file name 1631 may be any character string as long as it is uniquely identifiable. The video data 1634 is video data captured by the camera 110. The sensed data 1635-1 to 1635-n is data sensed by the sensors 150-1 to 150-n. The time-of-day information 1632 represents the time of day at which the video data 1634 and the sensed data 1635-1 to 1635-n are acquired. When there are a plurality of acquired times of day, the oldest time of day and the latest time of day are included. The position information 1633 represents the position of the vehicle where the video data 1634 and the sensed data 1635-1 to 1635-n are acquired.

The transmission buffer 164 is a storage area for recording a file to be transmitted to an external server device.

Figure 5:
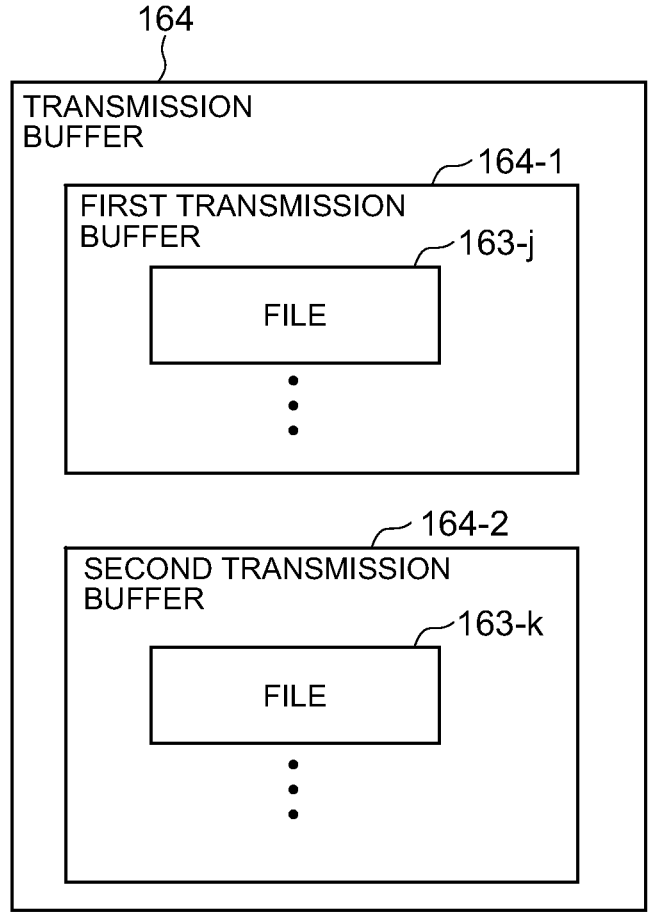
FIG. 5 illustrates an exemplary configuration of a transmission buffer of the drive recorder according to the first exemplary embodiment of the present invention.

FIG. 5 illustrates an exemplary configuration of the transmission buffer 164. The transmission buffer 164 of this example is configured of a first transmission buffer 164-1 and a second transmission buffer 164-2. The first transmission buffer 164-1 is a buffer for recording a file 163-j including high-quality driving condition data. The second transmission buffer 164-1 is a buffer for recording a file 163-k including low-quality driving condition data. The file 163-j and the file 163-k have the same configuration as that of the file 163-i illustrated in FIG. 4. However, the video data 1634 and the sensed data 1635-1 to 1635-n of the file 163-k have lower quality, compared with that of the video data 1634 and the sensed data 1635-1 to 1635-n of the file 163-j.

The arithmetic processing unit 170 includes a microprocessor such as a CPU and its peripheral circuits, and has a function of reading the program 161 from the storage unit 160 and executing it to thereby allow the hardware and the program 161 to cooperate with each other to implement various processing units. The main processing units implemented by the arithmetic processing unit 170 include an acquisition unit 171, a recording unit 172, a communication unit 173, and a control unit 174.

The acquiring unit 171 has a function of acquired high-quality data representing the driving condition by using the camera 110 and the sensors 150-1 to 150-n. For example, the acquisition unit 171 uses the camera 110 to constantly acquire a video having high resolution and a high frame rate. The acquisition unit 171 also uses the sensors 150-1 to 150-n to acquire sensed data having high resolution at high frequency. Moreover, the acquisition unit 171 has a function of recording the acquired video data and sensed data in the video buffer 162-0 and the sensed data buffers 162-1 to 162-n of the driving condition buffer 162, in association with the time-of-day information and the position information. In order to perform the aforementioned association, the acquisition unit 171 acquires the time-of-day information from the time-of-day sensor, and acquires the position information from the GPS sensor.

The recording unit 172 has a function of detecting an abnormal event. For example, the recording unit 172 detects acceleration of the vehicle by the acceleration sensor, and when the detected acceleration exceeds a reference value, the recording unit 172 detects that an abnormal event has occurred. Alternatively, the recording unit 172 detects the speed of the vehicle by the vehicle speed sensor, and when the detected vehicle speed exceeds the legal speed limit by a predetermined value or larger, the recording unit 172 detects that an abnormal event has occurred. The legal speed limit of the traveling place can be obtained by means of a method of recognizing an image of a road sign captured by the camera 110, a method of acquiring it from car navigation, or the like, for example. Alternatively, the recording unit detects biological information (one or a combination of body temperature, blood pressure, heart rate, blood glucose, used calories, brain waves, oxygen concentration, expiration, posture, and the like, for example) of the driver by the biological sensor, and compares it with normal values, and when the biological information is out of the normal values, the recording unit 172 detects that an abnormal event has occurred.

The recording unit 172 also has a function of, upon detection of an abnormal event, acquiring driving condition data of a predetermined time width including the time of day when the abnormal event is detected, from the driving condition buffer 162. Here, the predetermined time width may be a fixed value, or a variable value that varies in accordance with the driving condition such as vehicle speed, for example.

The recording unit 172 also has a function of recording the acquired driving condition data in the driving condition saving unit 163 as a file, without changing the quality (that is, maintaining high quality). Furthermore, the recording unit 172 also has a function of acquiring, from the driving condition buffer 162 or the driving condition saving unit 163, driving condition data to be transmitted to an external server device, recording it as a file in the first transmission buffer 164 of the transmission buffer 164 without changing the quality (that is, maintaining the high quality), or recording it as a file in the second transmission buffer 164-2 of the transmission buffer 164 while changing it to have low quality. Whether to record a file including high-quality driving condition data in the transmission buffer 164 or to record a file including low-quality driving condition data in the transmission buffer 164 is controlled by the control unit 174.

The recording unit 172 changes the quality of the driving condition data to low quality as described below. In the case of video data captured by the camera 110, the recording unit 172 may lower the resolution of the video data by thinning out the number of pixels per frame. In the case of video data captured by the camera 110, the recording unit 172 may lower the frame rate of the video data by thinning out frames. The recording unit 172 may lower the image quality of the video data by reducing the amount of information (the number of bits) per pixel. In the case of the sensed data acquired by the sensors 150-1 to 150-n, the recording unit 172 may lower the spatial resolution of the sensed data by reducing the amount of information (the number of bits) per measurement. The recording unit 172 may lower the temporal resolution of the sensed data by thinning out the number of pieces of sensed data per unit time.

The communication unit 173 has a function of transmitting, to an external server device, a file including driving condition data recorded in the first transmission buffer 164-1 and the second transmission buffer 164-2 of the transmission buffer 164, via the communication I/F unit 120. The communication unit 173 also has a function of processing the first transmission buffer 164-1 in preference to the second transmission buffer 164-2. For example, when there are files not having been transmitted in both the first transmission buffer 164-1 and the second transmission buffer 164-2, the communication unit 173 preferentially extracts a file from the first transmission buffer 164-1 and transmits it, and when transmission of all of the files recorded in the first transmission buffer 164-1 is completed, the communication unit 173 extracts a file from the second transmission buffer 164-2 and transmits it.

The control unit 174 has a function of controlling the quality of the driving condition data to be transmitted to an external server device by the communication unit 173, based on a command received from the outside via the communication I/F unit 120.

FIG. 6 illustrates an exemplary format of a command used in the present embodiment. In this example, two types of commands, namely an ON command and an OFF command, are shown. An ON command is a command to set the quality of the driving condition data, to be transmitted by the communication unit 173 to the external server device, to high quality. An OFF command is a command to set it to low quality, on the contrary. To the ON command and the OFF command, command number 1 and command number 2 are allocated, respectively, whereby the type of a command is identified by the command number. Each of the ON command and an OFF command has a parameter 1 in which a vehicle code or a NULL value can be set. When a vehicle code is set in the parameter 1, the control unit 174 that received the command compares the vehicle code set in the own vehicle (previously set in the control unit 174) with the vehicle code set in the parameter 1. When they match, the control unit 174 accepts the command, while when they do not match, the control unit 174 disregards the command. Further, when a NULL value is set in the parameter 1 or when the parameter 1 is omitted, the control unit 174 that received the command accepts the command unconditionally.

Next, operation of the drive recorder 100 will be described with reference to FIG. 7.

Figure 7:
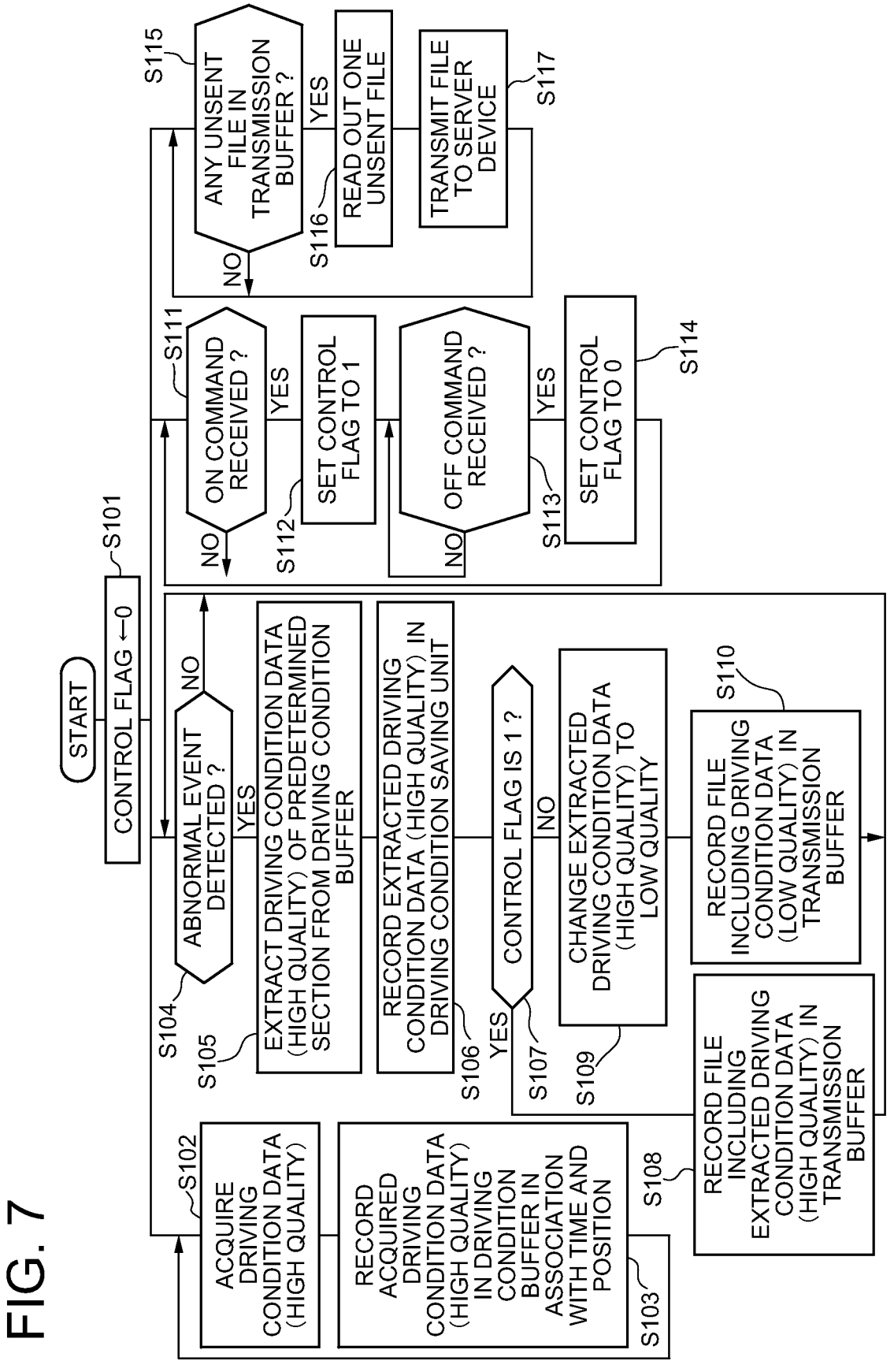
FIG. 7 is a flowchart illustrating an exemplary operation of the drive recorder according to the first exemplary embodiment of the present invention.

When the ignition switch of the vehicle is turned on, the drive recorder 100 starts operation illustrated in FIG. 7.

First, the control unit 174 initializes a control flag that is an internal variable to a value 0 (S101).

Then, the acquisition unit 171 uses the camera 110 and the sensors 150-1 to 150-n of the drive recorder 100 to start operation of acquiring a video of the front side in the traveling direction of the vehicle and high-quality data representing the driving condition such as acceleration (S102). Then, the acquisition unit 171 records the acquired high-quality data representing the driving condition in the driving condition buffer 162, in association with the time-of-day information and the position information (S103). Acquisition of the high-quality driving condition data and recording it in the driving condition buffer 162 are continued until the ignition switch of the vehicle is turned off.

In parallel with the operation described above, the recording unit 172 detects presence or absence of an abnormal event (S104). When detecting an abnormal event, the recording unit 172 extracts driving condition data of a predetermined time width including the detected time of day from the driving condition buffer 163 (S105), and records a file including the extracted driving condition data in the driving condition saving unit 163 (S106). Then, the recording unit 172 determines whether the value of the control flag is 1 or not (S107). When the value of the control flag is 1, the recording unit 172 records a file including the high-quality driving condition data extracted at step S106, in the first transmission buffer 164-1 (S108). When the value of the control flag is 0, the recording unit 172 changes the high-quality driving condition data extracted at step S106 to low-quality data (S109). Then, the recording unit 172 records the low-quality driving condition data in the second transmission buffer 164-2 (S110).

In parallel with the operation described above, the control unit 174 detects whether or not it received a valid ON command from an external server device or the like via the communication I/F unit 120 (S111). Here, a valid ON command means an ON command in which the vehicle code of the own vehicle is set in the parameter 1 of FIG. 6 or the parameter 1 is omitted. Upon receiving a valid ON command, the control unit 174 sets the control flag to a value 1 (S112). Then, the control unit 174 detects whether or not it received a valid OFF command from an external server device or the like via the communication I/F unit 120 (S113). Here, a valid OFF command means an OFF command in which the vehicle code of the own vehicle is set in the parameter 1 of FIG. 6 or the parameter 1 is omitted. Then, upon receiving a valid OFF command, the control unit 174 sets the control flag to a value 0 (S114), and returns to the process of step S111 to detect reception of a valid ON command. The control flag in which the value is controlled by the control unit 174 is referred to at step S107 by the recording unit 172 as described above.

In parallel with the operation described above, the communication unit 173 performs an operation described below. First, the communication unit 173 determines whether or not there is an unsent file in the transmission buffer 164 (S115). Then, when there is one, the communication unit 173 reads out one unsent file (S116). At this time, when there are unsent files in both the first transmission buffer 164-1 and the second transmission buffers 164-2, the communication unit 173 preferentially reads out an unsent file from the first transmission buffer 164-1. Next, the communication unit 173 uses the communication I/F unit 120 to transmit the readout file to an external server device (S117). Then, the communication unit 173 returns to step S115, and repeats the same operation as that described above.

As described above, according to the present embodiment, it is possible to achieve both reduction of the communication cost and effective utilization of the driving condition data. This is because the control unit 174 controls the quality of the driving condition data to be transmitted to an external server device by the communication unit 173, based on an ON command and an OFF command received from the outside. That is, the importance of the driving condition data is not constant. Some are important and others are not. Therefore, an administrator of an external server device or the like makes the quality high for important data and makes it low for not important data by using an ON command and an OFF command. Thereby, it is possible to achieve effective utilization of the driving condition data while reducing the communication cost.

Second Exemplary Embodiment

Next, a drive recorder according to a second exemplary embodiment of the present invention will be described. A drive recorder according to the present embodiment differs from the drive recorder according to the first exemplary embodiment in the format of a command received from the outside and the function of the control unit 174. The other aspects are the same as those of the drive recorder according to the first exemplary embodiment.

FIG. 8 illustrates an exemplary format of a command used in the present embodiment. In this example, two types of commands, namely an ON command and an OFF command, are shown. An OFF command has the same function as that of the OFF command illustrated in FIG. 6. An ON command is configured such that a parameter 2 is added to the ON command illustrated in FIG. 6. In the parameter 2, temporal start time and end time of high quality ON setting can be set. For example, in the case of setting high quality ON setting for a time period from Sep. 22, 2016, 13:15 until 16:30 of the same day, "Sep. 22, 2016, 13:15:Sep. 22, 2016, 16:305" is set in the parameter 2. In the parameters 2, it is also possible to set only the start time or end time. For example, when "Sep. 22, 2016, 13:15:" is set, high-quality ON setting is set from Sep. 22, 2016, 13:15. Further, when ":Sep. 22, 2016, 16:30" is set, for example, high-quality ON setting is set unit Sep. 22, 2016, 16:305.

Next, operation of the drive recorder according to the present embodiment will be described.

Operation of the drive recorder according to the present embodiment differs from the drive recorder according to the first exemplary embodiment in the operation of the control unit 174. The other aspects are the same as those of the drive recorder according to the first exemplary embodiment. The control unit 174 of the drive recorder according to the present embodiment is configured to perform steps S211 to S216 illustrated in FIG. 9, instead of steps S111 to S114 illustrated in FIG. 7.

Figure 9:
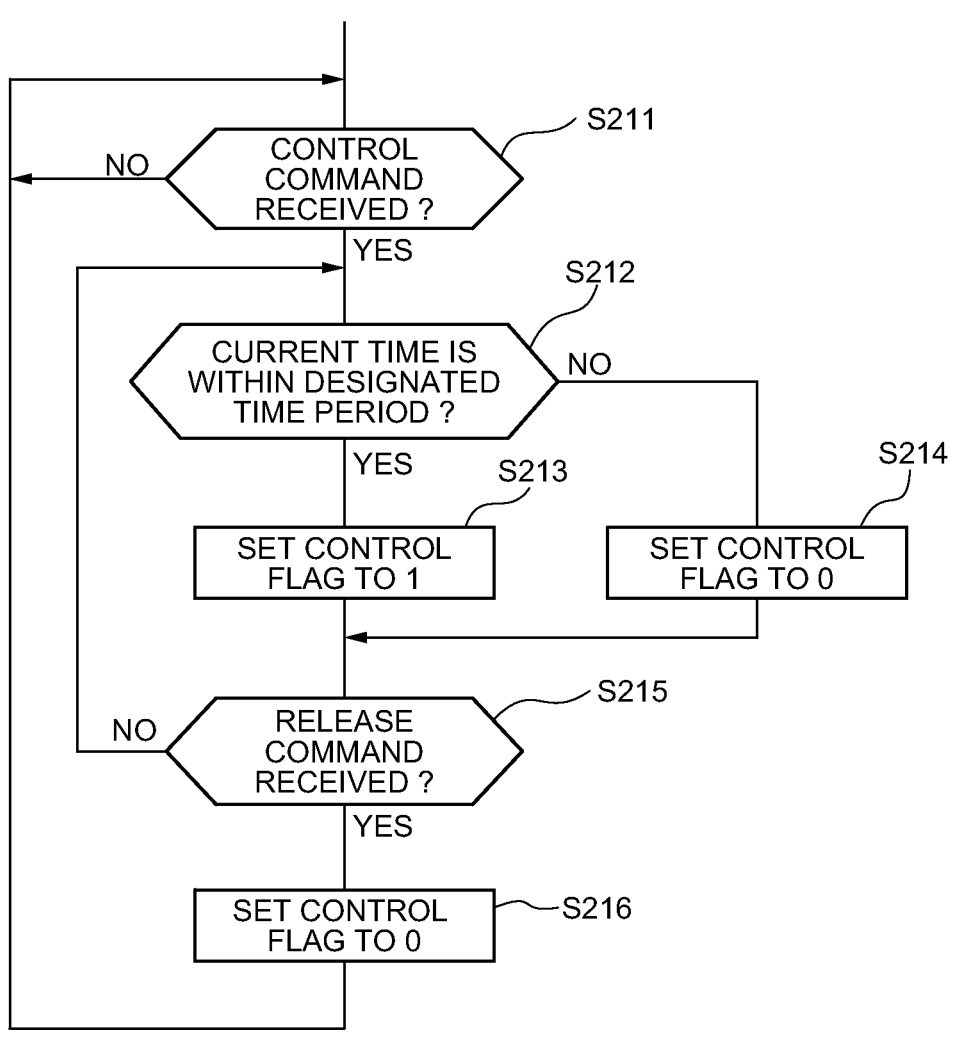
FIG. 9 is a flowchart illustrating an exemplary operation of a main part of a drive recorder according to the second exemplary embodiment of the present invention.

Referring to FIG. 9, the control unit 174 detects whether or not it received a valid ON command from an external server device or the like via the communication I/F unit 120 (S211). Then, upon receiving a valid ON command, the control unit 174 determines whether or not the current time of day is within the time period set in the parameter 2 (S212). Next, when the current time of day is within the time period set in the parameter 2, the control unit 174 sets the control flag to a value 1 (S213), while if not, it sets the control flag to a value 0 (S214). Then, the control unit 174 detects whether or not it received a valid OFF command from an external server device or the like via the communication I/F unit 120 (S215). Then, when the control unit 174 did not receive a valid OFF command, the control unit 174 returns to step S212 and repeats the process similar to that described above. Meanwhile, upon receiving a valid OFF command, the control unit 174 sets the control flag to a value 0 (S216), and returns to step S211 to repeat the process similar to that described above.

As described above, according to the present embodiment, it is possible to achieve both reduction of the communication cost and effective utilization of the driving condition data by the same grounds as that in the case of the first exemplary embodiment. In particular, the present embodiment is effective when the importance of driving condition data varies depending on the time period. For example, it is possible to use a drive recorder in such a manner that high-quality driving condition data is transmitted to an external server in a time period in which a so-called near-miss is likely to happen, while low-quality driving condition data is transmitted to an external server in other time period in order to reduce the communication cost.

Third Exemplary Embodiment

Next, a drive recorder according to a third exemplary embodiment of the present invention will be described. A drive recorder according to the present embodiment differs from the drive recorder according to the first exemplary embodiment in the format of a command received from the outside and the function of the control unit 174. The other aspects are the same as those of the drive recorder according to the first exemplary embodiment.

FIG. 10 illustrates an exemplary format of a command used in the present embodiment. In this example, two types of commands, namely an ON command and an OFF command, are shown. An OFF command has the same function as that of the OFF command illustrated in FIG. 6. An ON command is configured such that a parameter 2 is added to the ON command illustrated in FIG. 6. In the parameter 2, geographical area information in which high quality ON setting is used can be set. Area information can be represented by position information (for example, latitude and longitude) of two points (for example, end points at upper left and lower right of a rectangular region).

Next, operation of the drive recorder according to the present embodiment will be described.

Operation of the drive recorder according to the present embodiment differs from the drive recorder according to the first exemplary embodiment in the operation of the control unit 174. The other aspects of are the same as those of the drive recorder according to the first exemplary embodiment. The control unit 174 of the drive recorder according to the present embodiment is configured to perform steps S311 to S316 illustrated in FIG. 11, instead of steps S111 to S114 illustrated in FIG. 7.

Figure 11:
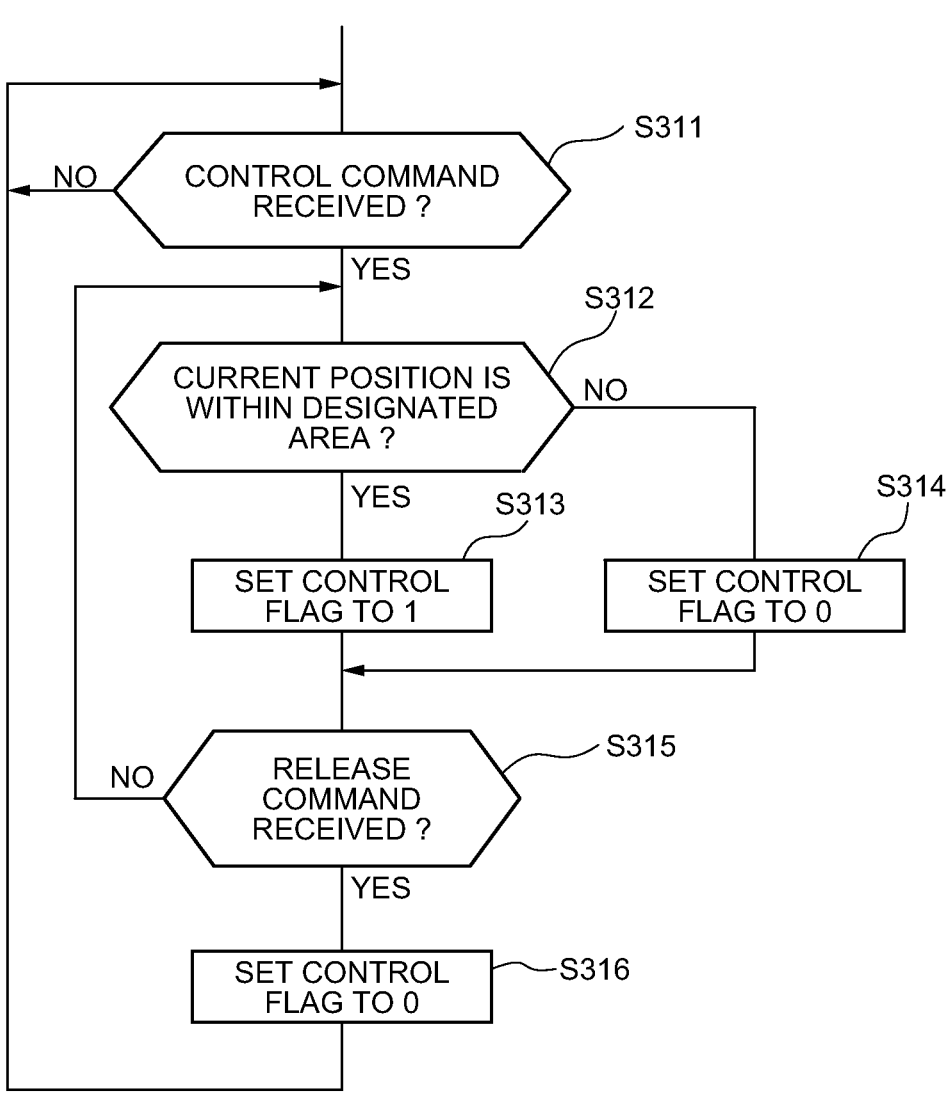
FIG. 11 is a flowchart illustrating an exemplary operation of a main part of a drive recorder according to the third exemplary embodiment of the present invention.

Referring to FIG. 11, the control unit 174 detects whether or not it received a valid ON command from an external server device or the like via the communication I/F unit 120 (S311). Then, upon receiving a valid ON command, the control unit 174 determines whether or not the current position of the own vehicle is within the area defined by the area information set in the parameter 2 (S312). When the current position is within the area, the control unit 174 sets the control flag to a value 1 (S313), while if not, it sets the control flag to a value 0 (S314). Then, the control unit 174 detects whether or not it received a valid OFF command from an external server device or the like via the communication I/F unit 120 (S315). When the control unit 174 did not receive a valid OFF command, the control unit 174 returns to step S312 and repeats the process similar to the process described above. Meanwhile, upon receiving a valid OFF command, the control unit 174 sets the control flag to a value 0 (S316), and returns to step S311 to repeat the processing similar to that described above.

As described above, according to the present embodiment, it is possible to achieve both reduction of the communication cost and effective utilization of the driving condition data by the grounds similar to those in the case of the first exemplary embodiment. In particular, the present embodiment is effective when the importance of driving condition data varies depending on the place where the vehicle is located. For example, it is possible to use a drive recorder in such a manner that high-quality driving condition data is transmitted to an external server in an area in which a so-called near-miss is likely to happen, while low-quality driving condition data is transmitted to an external server in other areas in order to reduce the communication cost.

Fourth Exemplary Embodiment

Next, a drive recorder according to a fourth exemplary embodiment of the present invention will be described. A drive recorder according to the present embodiment differs from the drive recorder according to the first exemplary embodiment in the format of a command received from the outside and the function of the recording unit 172. The other aspects are the same as those of the drive recorder according to the first exemplary embodiment.

FIG. 12 illustrates an exemplary format of a command used in the present embodiment. In this example, two types of commands, namely an ON command and an OFF command, are shown. An OFF command has the same function as that of the OFF command illustrated in FIG. 6. An ON command is configured such that a parameter 2 is added to the ON command illustrated in FIG. 6. In the parameter 2, feature information of the driving condition data can be set. Feature information includes the type of a sensor and the feature amount. The type of a sensor represents the type of the camera 110 and the sensors 150-1 to 150-n. Feature amount represents the feature amount included in the data sensed by the sensor. For example, a vehicle number on the license plate of another vehicle existing in the video sensed by the camera 110 is one example of the feature amount. Also, a color of clothes of a person existing in the image is another example of the feature amount. Also, a specific change pattern in the acceleration represented by time-series data of acceleration sensed by the acceleration sensor is another example of the feature amount.

Next, operation of the drive recorder according to the present embodiment will be described.

Operation of the drive recorder according to the present embodiment differs from the drive recorder according to the first exemplary embodiment in the operation of the recording unit 172. The other aspects are the same as those of the drive recorder according to the first exemplary embodiment. The recording unit 172 of the drive recorder according to the present embodiment is configured to perform steps S401 to S409 illustrated in FIG. 13, instead of steps S104 to S110 illustrated in FIG. 7.

Figure 13:
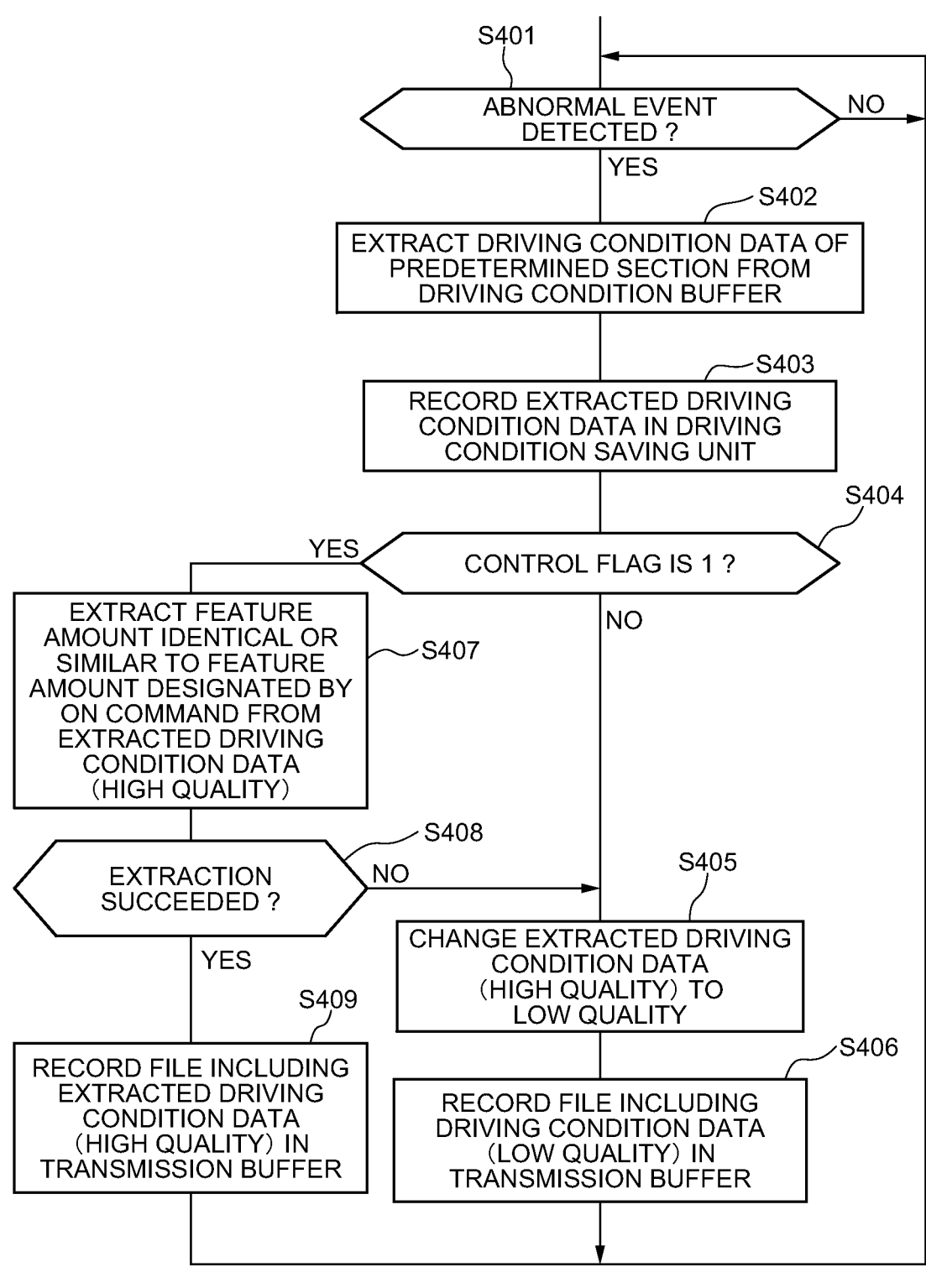
FIG. 13 is a flowchart illustrating an exemplary operation of a main part of a drive recorder according to the fourth exemplary embodiment of the present invention.

In FIG. 13, steps S401 to S406 are the same as steps S104 to S107, S109, and S110 of FIG. 7. That is, when the recording unit 172 detects an abnormal event (S401), the recording unit 172 extracts driving condition data of a predetermined time width including the detected time of day from the driving condition buffer 163 (S402), records it in the driving condition saving unit 163 (S403), and when the value of the control flag is 0 (S404), records low-quality driving condition data in the second transmission buffer 164-2 (S405, S406).

On the other hand, when the value of the control flag is 1, the recording unit 172 extracts a feature amount that is identical or similar to the feature amount designated by the parameter 2 of the ON command, from the sensed data of the type defined by the parameter 2 of the ON command in the driving condition data extracted at step S402 (S407). For example, when the vehicle number in the video captured by the camera 110 is set as the feature amount, the recording unit 172 first detects the license plate of the vehicle from the video captured by the camera 110 extracted at step S402. Then, the recording unit 172 recognizes the image of the characters and the numbers shown on the detected license plate to thereby recognize the vehicle number. Then, the recording unit 172 compares the detected vehicle number with the vehicle number defined by the parameter 2 of the ON commands, and when they match, the recording unit 172 determines that it has succeeded in extracting the set feature amount. Meanwhile, when the license plate of the vehicle cannot be detected, or when the vehicle number of the other vehicle does not match the number defined by the parameter 2 although it is detected, the recording unit 172 determines that it has failed in extracting the set feature amount. When the recording unit 172 has succeeded in extracting the set feature amount, the recording unit 172 records a file including the high-quality driving condition data extracted at step S402 in the first transmission buffer 164-1 (S409). Meanwhile, when the recording unit 172 has failed in extracting the set feature amount, the recording unit 172 changes the high-quality driving condition data extracted at step S402 to low-quality data (S405), and records it in the second transmission buffer 164-2 (S406).

As described above, according to the present embodiment, it is possible to achieve both reduction of the communication cost and effective utilization of the driving condition data by the grounds similar to that in the case of the first exemplary embodiment. In particular, the present embodiment is effective when the importance of driving condition data varies depending on presence or absence of a particular feature amount.

Fifth Exemplary Embodiment

Next, a drive recorder according to a fifth exemplary embodiment of the present invention will be described. The drive recorder according to the present embodiment differs from the drive recorder according to the first exemplary embodiment in the format of a command received from the outside and the functions of the recording unit 172 and the control unit 174. The other aspects are the same as those of the drive recorder according to the first exemplary embodiment.

FIG. 14 illustrates an exemplary format of a command used in the present embodiment. In this example, one type of command, namely a search command, is shown. A search command is a command that requests a search. To the search command, a command number 1 is allocated, and the type of the command is identified by the command number. The search command has a parameter 1 in which a vehicle code or a NULL value can be set. When a vehicle code is set in the parameter 1, the control unit 174 that received the command compares the vehicle code set in the own vehicle with the vehicle code set in the parameter 1. When they match, the control unit 174 accepts the command, while when they do not match, the control unit 174 disregards the command. Further, when a NULL value is set in the parameter 1 or when the parameter 1 is omitted, the control unit 174 that received the command accepts the command unconditionally.

In addition, the search command has a parameter 2 in which search conditions can be set. The search conditions include a time period, an area, a feature amount, or a combination thereof. The time period designates a temporal condition to be searched by at least one of temporal start time and end time, similar to the parameter 2 illustrated in FIG. 8. The area designates a geographical condition to be searched by area information similar to that of the parameter 2 illustrated in FIG. 10. The feature amount designates a content condition to be searched by feature information similar to that of the parameter 2 illustrated in FIG. 12.

In addition, the search command has a parameter 3 in which a search target can be set. As the search target, either one or both of the driving condition buffer 162 and the driving condition saving unit 163 can be set.

Next, operation of the drive recorder according to the present embodiment will be described.

Figure 15:
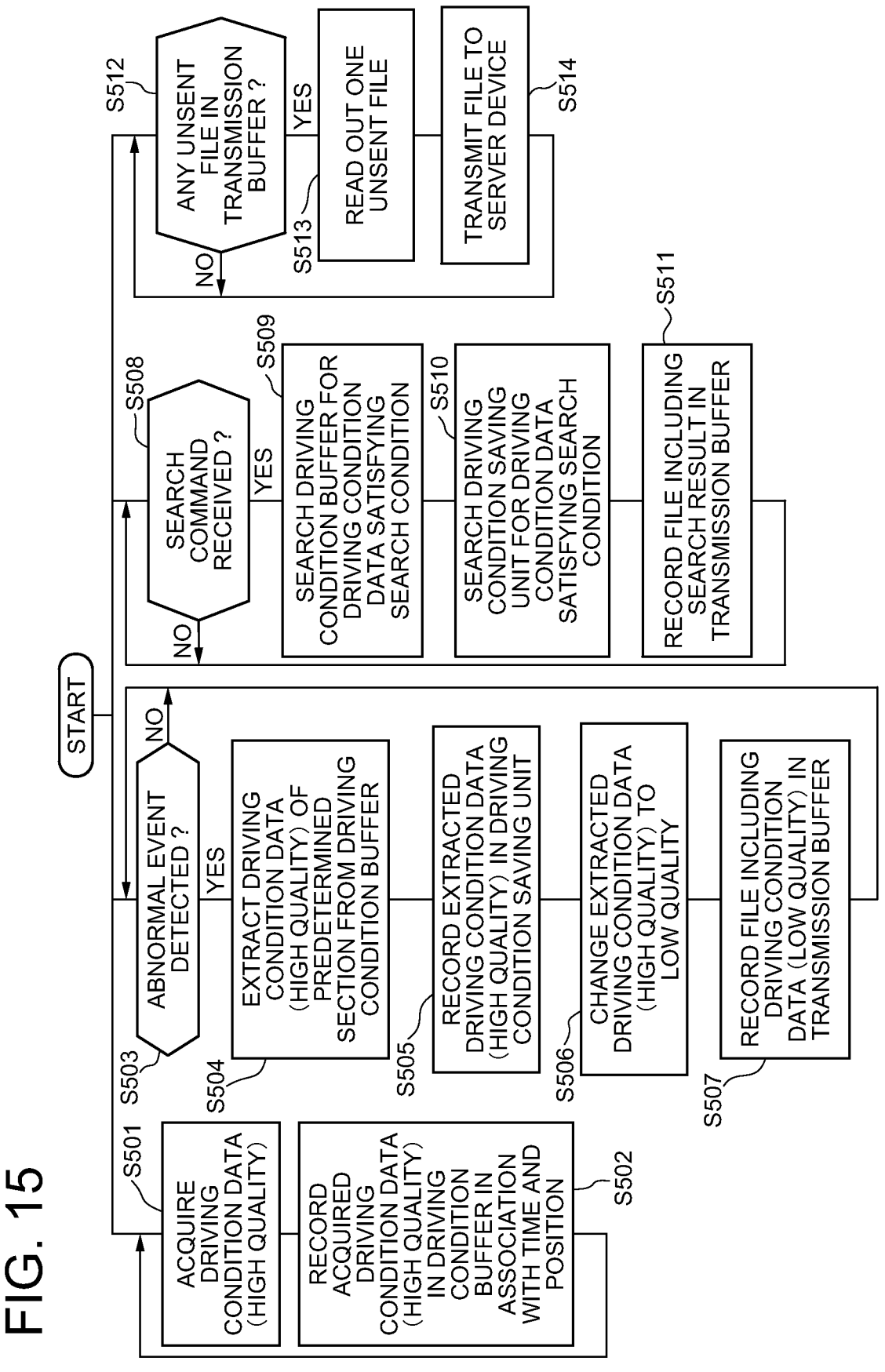
FIG. 15 is a flowchart illustrating an exemplary operation of a main part of a drive recorder according to the fifth exemplary embodiment of the present invention.

When the ignition switch of the vehicle is turned on, for example, the drive recorder of the present embodiment starts operation illustrated in FIG. 15. In FIG. 15, steps S501 to S502 executed by the acquisition unit 171 and steps S512 to S514 executed by the communication unit 173 are the same as steps S102 to S103 and S115 to S117 in FIG. 7.

In parallel with the operation by the acquisition unit 171 and the communication unit 173 described above, the recording unit 172 detects presence or absence of an abnormal event (S503). Then, when detecting an abnormal event, the recording unit 172 extracts driving condition data of a predetermined time width including the detected time of day from the driving condition buffer 163 (S504), and records a file including the extracted driving condition data in the driving condition saving unit 163 (S505). Then, the recording unit 172 changes the high-quality driving condition data extracted at step S504 to low-quality data (S506). Then, the recording unit 172 records the low-quality driving condition data in the second transmission buffer 164-2 (S507).

In parallel with the operation described above, the control unit 174 detects whether or not it received a valid search command from an external server device or the like via the communication I/F unit 120 (S508). Here, a valid search command means a search command in which the vehicle code of the own vehicle is set in the parameter 1 of FIG. 14 or the parameter 1 is omitted. Upon receiving a valid search command, the control unit 174 performs a search as described below.

First, when the driving condition buffer 162 is set as a search target by the parameter 3 of the search command, the control unit 174 searches the driving condition buffer 162 for driving condition data that matches the search condition set in the parameter 2 (S509). For example, when a time period is set as a search condition, the control unit 174 acquires driving condition data having the time-of-day information within the time period set as the search condition from the driving condition data recorded in the driving condition buffer 162 (acquired result 1). When an area is set as a search condition, the control unit 174 acquires driving condition data having the position information within the area set as the search condition from the driving condition data recorded in the driving condition buffer 162 (acquired result 2). When a feature amount is set as a search condition, the control unit 174 acquires driving condition data having the feature amount set as the search condition from the driving condition data recorded in the driving condition buffer 162 (acquired result 3). When any two of or all three of a time period, an area, and a feature amount are set as search conditions under the condition of AND, the control unit 174 acquires driving condition data existing in any two of or all three of the acquired result 1, the acquired result 2, and the acquired result 3 (acquired result 4). When any two of or all three of a time period, an area, and a feature amount are set as search conditions under the condition of OR, the control unit 174 acquires driving condition data existing in any of the acquired result 1, the acquired result 2, and the acquired result 3 (acquired result 5).

Next, when the driving condition saving buffer 163 is set as a search target by the parameter 3 of the search command, the control unit 174 searches the driving condition saving unit 163 for a file including the driving condition data that matches the search condition set in the parameter 2 (S510). For example, when a time period is set as a search condition, the control unit 174 acquires a file including the driving condition data having the time-of-day information within the time period set as the search condition, from among the files recorded in the driving condition saving unit 163 (acquired result 6). When an area is set as a search condition, the control unit 174 acquires a file including the driving condition data having the position information within the area set as the search condition, from among the files recorded in the driving condition saving unit 163 (acquired result 7). When a feature amount is set as a search condition, the control unit 174 acquires a file including the driving condition data having the feature amount set as the search condition, from among the files recorded in the driving condition saving unit 163 (acquired result 8). When any two of or all three of a time period, an area, and a feature amount are set as search conditions under the condition of AND, the control unit 174 acquires a file existing in any two of or all three of the acquired result 1, the acquired result 2, and the acquired result 3 (acquired result 9). When any two of or all three of a time period, an area, and a feature amount are set as search conditions under the condition of OR, the control unit 174 acquires a file existing in any of the acquired result 6, the acquired result 7, and the acquired result 8 (acquired result 10).

Next, the control unit 174 records the file including the search result obtained at steps S509 and S510 in the second transmission buffer 164-2 of the transmission buffer 164 (S511). Thereafter, the control unit 174 returns to the process of step S508.

As described above, according to the present embodiment, it is possible to achieve both reduction of the communication cost and effective utilization of the driving condition data. This is because when acquiring driving condition data that matches the search condition designated by a search command from the driving condition data recorded in the driving condition buffer 162 and the driving condition saving unit 163, high-quality driving condition data is allowed to be transmitted to effectively utilize the driving condition data transmission of high-quality driving, while in a normal state other than that, low-quality driving condition data is allowed to be transmitted.

Sixth Exemplary Embodiment

Next, a drive recorder according to a sixth exemplary embodiment of the present invention will be described.

Figure 16:
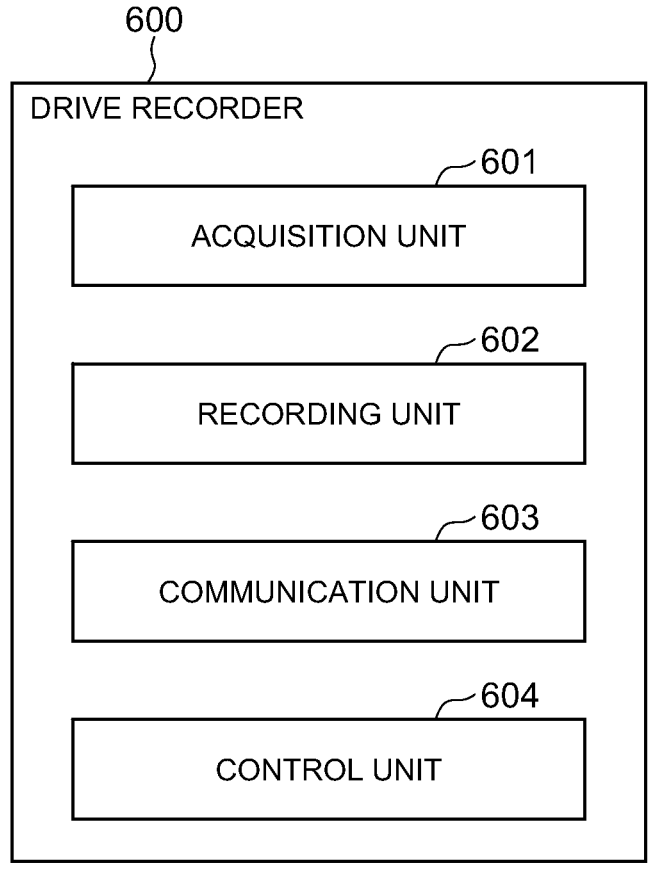
FIG. 16 is a block diagram of a drive recorder according to a sixth exemplary embodiment of the present invention.

Referring to FIG. 16, a drive recorder 600 according to the present embodiment is mounted on a vehicle such as an automobile, and has a function of recording driving condition of the vehicle. The drive recorder 600 includes an acquisition unit 601, a recording unit 602, a communication unit 603, and a control unit 604.

The acquisition unit 601 has a function of acquiring data representing the driving condition. The acquisition unit 601 can be configured of a dedicated hardware, or by a general-purpose computer and a program. The acquisition unit 601 can be configured similar to the acquisition unit 171 of the first to fifth exemplary embodiments, for example.

The recording unit 602 has a function of recording data acquired by the acquisition unit 601. The recording unit 602 can be configured of a dedicated hardware, or by a general-purpose computer and a program. The recording unit 602 can be configured similar to the recording unit 172 of the first to fifth exemplary embodiments, for example.

The communication unit 603 has a function of transmitting data acquired by the acquisition unit 601 to the outside. The communication unit 603 can be configured of a dedicated hardware, or by a general-purpose computer and a program. The communication unit 603 can be configured similar to the communication unit 173 of the first to fifth exemplary embodiments, for example.

The control unit 604 has a function of controlling the quality of data to be transmitted to the outside by the communication unit 603, based on the information received from the outside. The control unit 604 can be configured of a dedicated hardware, or by a general-purpose computer and a program. The control unit 604 can be configured similar to the control unit 174 of the first to fifth exemplary embodiments, for example.

The drive recorder 600 according to the present embodiment configured as described above functions as described below. The acquisition unit 601 acquires data representing the driving condition, the recording unit 602 records the acquired data, and the communication unit 603 transmits the acquired data to the outside. Then, the control unit 604 controls the quality of the data to be transmitted, based on the information received from the outside.

As described above, according to the present embodiment, it is possible to achieve both reduction of the communication cost and effective utilization of the driving condition data. This is because the control unit 604 controls the quality of the driving condition data to be transmitted to the outside by the communication unit 603, based on the information received from the outside. That is, the importance of the driving condition data is not constant. Some are important and others are not. Therefore, it is possible to achieve effective utilization of the driving condition data while reducing the communication cost by making the quality higher for important data and making it lower for not important data based on the information received from the outside.

While the present invention has been described with reference to the exemplary embodiments described above, the present invention is not limited to the above-described embodiments. Various additions and changes can be made within the scope of the present invention. For example, in the exemplary embodiments described above, the data representing the driving condition includes both image data captured by the camera 110 and sensed data sensed by the sensors 150-1 to 150-$n$. However, the data representing the driving condition of the present invention may include at least one of image data captured by the camera 110 and sensed data sensed by the sensors 150-1 to 150-$n$. The present invention is based upon and claims the benefit of priority from Japanese patent application No. 2016-189863, filed on Sep. 28, 2016, the disclosure of which is incorporated herein in its entirety by reference.

INDUSTRIAL APPLICABILITY

The present invention is applicable to a drive recorder in general. In particular, the present invention is suitable for a drive recorder that transmits data representing driving condition acquired by a camera or the like to an external server device through communication.

The whole or part of the exemplary embodiments disclosed above can be described as, but not limited to, the following supplementary notes.

[Supplementary Note 1]

A drive recorder to be mounted on a vehicle, the drive recorder comprising:

an acquisition unit that acquires data representing driving condition;

a recording unit that records the acquired data;

a communication unit that transmits the acquired data to outside; and a control unit that controls quality of the data to be transmitted based on information received from outside.

[Supplementary Note 2]

The drive recorder according to supplementary note 1, wherein the control unit includes means for receiving a predetermined command from the outside, and controls the quality of the data to be transmitted based on whether or not the command is received.

[Supplementary Note 3]

The drive recorder according to supplementary note 1, wherein the control unit includes means for receiving, from the outside, a command in which a temporal condition is set, and means for determining whether or not the temporal condition is satisfied, and controls the quality of the data to be transmitted based on a result of the determination.

[Supplementary Note 4]

The drive recorder according to supplementary note 1, wherein the control unit includes means for receiving, from the outside, a command in which a geographical condition is set, and means for determining whether or not a position of the vehicle satisfies the geographical condition, and controls the quality of the data to be transmitted based on a result of the determination.

[Supplementary Note 5]

The drive recorder according to supplementary note 1, wherein the control unit includes means for receiving, from the outside, a command in which a condition related to a feature of data is set, and means for determining whether or not the data represents driving condition satisfying the condition, and controls the quality of the data to be transmitted based on a result of the determination.

[Supplementary Note 6]

The drive recorder according to supplementary note 1, wherein the control unit includes means for receiving, from the outside, a command in which a search condition is set, and means for searching the recorded data for data satisfying the search condition, and controls the quality of the data to be transmitted based on whether or not the data to be transmitted is searched data.

[Supplementary Note 7]

The drive recorder according to any of supplementary notes 1 to 6, wherein the communication unit includes a first transmission buffer that records data representing driving condition and having first quality, and a second transmission buffer that records data representing driving condition and having second quality that is lower than the first quality, and the communication unit transmits the data recorded in the first transmission buffer in preference to the data recorded in the second transmission buffer.

[Supplementary Note 8]

A driving condition management method to be executed by a drive recorder to be mounted on a vehicle, the method comprising:

acquiring data representing driving condition;

recording the acquired data;

transmitting the acquired data to outside; and controlling quality of the data to be transmitted based on information received from outside.

[Supplementary Note 9]

The drive recorder according to supplementary note 8, wherein the controlling the quality includes controlling the quality of the data to be transmitted based on whether or not a predetermined command is received from the outside.

[Supplementary Note 10]

The drive recorder according to supplementary note 8, wherein the controlling the quality includes receiving, from the outside, a command in which a temporal condition is set, determining whether or not the temporal condition is satisfied, and controlling the quality of the data to be transmitted based on a result of the determination.

[Supplementary Note 11]

The drive recorder according to supplementary note 8, wherein the controlling the quality includes receiving, from the outside, a command in which a geographical condition is set, determining whether or not a position of the vehicle satisfies the geographical condition, and controlling the quality of the data to be transmitted based on a result of the determination.

[Supplementary Note 12]

The drive recorder according to supplementary note 8, wherein the controlling the quality includes receiving, from the outside, a command in which a condition related to a feature of data is set, determining whether or not the data represents driving condition satisfying the condition, and controlling the quality of the data to be transmitted based on a result of the determination.

[Supplementary Note 13]

The drive recorder according to supplementary note 8, wherein the controlling the quality includes receiving, from the outside, a command in which a search condition is set, searching the recorded data for data satisfying the search condition, and controlling the quality of the data to be transmitted based on whether or not the data to be transmitted is searched data.

[Supplementary Note 14]

The drive recorder according to any of supplementary notes 8 to 13 wherein the transmitting the data to the outside includes recording data representing driving condition and having first quality in a first transmission buffer, recording data representing driving condition and having second quality in a second transmission buffer, the second quality being lower than the first quality, and transmitting the data recorded in the first transmission buffer in preference to the data recorded in the second transmission buffer.

[Supplementary Note 15]

A program for causing a computer, to be mounted on a vehicle, to function as:

an acquisition unit that acquires data representing driving condition;

a recording unit that records the acquired data;

a communication unit that transmits the acquired data to outside; and a control unit that controls quality of the data to be transmitted based on information received from outside.

REFERENCE SIGNS LIST

100 drive recorder
110 camera
120 communication I/F unit
130 operation input unit
140 screen display unit
150-1 to 150-$n$ sensor
160 storage unit
161 program
162 driving condition buffer
162-0 video buffer
162-1 to 162-$n$ sensed data buffer
163 driving condition saving unit
163-1 to 163-$m$, 163-$i$, 163-$j$, 163-$k$ file
164 transmission buffer
164-1 first transmission buffer
164-2 second transmission buffer
170 arithmetic processing unit
171 acquisition unit
172 recording unit
173 communication unit
174 control unit
600 drive recorder
601 acquisition unit
602 recording unit
603 communication unit
604 control unit
1631 file name
1632 time-of-day information
1633 position information
1634 video data
1635-1 to 1635-$n$sensed data

The invention claimed is:

1. An apparatus to be mounted on a vehicle, the apparatus comprising:

a communication interface configured to perform data communication via a network;

a storage device comprising a first storage area and a second storage area, the first storage area being different from the second storage area;

a processor configured to execute instructions to:

store a first video file in the first storage area based on video captured by a camera mounted on the vehicle;

receive, from an external device via the communication interface, a command to activate video control based on a geographical the condition;

acquire position information of the vehicle;

determine whether the position information of the vehicle satisfies the geographical condition, wherein the geographical condition includes geographical area information, and the determining whether the position information of the vehicle satisfies the geographical condition includes determining whether a position of the vehicle represented by the position information of the vehicle is within an area represented by the geographical area information;

in a case that the position information of the vehicle satisfies the geographical condition, store a second video file in the second storage area based on video captured by the camera and transmit, to the external device, the second video file stored in the second storage area; and transmit, to the external device, the first video file stored in the first storage area in a case that the position information of the vehicle does not satisfies the geographic condition.

2. The apparatus according to claim 1, wherein the processor is further configured to execute the instructions to:

transmit data related to the second video file stored in the second storage area in preference to data related to the firsts video file stored in the first storage area.

3. The apparatus according to claim 1, wherein the processor is further configured to execute the instructions to:

automatically transmit the second video file stored in the second storage area.

4. The apparatus according to claim 1, further comprising the camera that captures video to be stored as the video files.

5. The apparatus according to claim 1, wherein the processor is further configured to execute the instructions to:

store the first video file of first quality in the first storage area; and in the case that the position information of the vehicle satisfies the geographical condition, store the second video file of second quality different from the first quality in the second storage area.

6. A method comprising:

storing a first video file in the first storage area based on video captured by a camera mounted on a vehicle;

receiving, from an external device via the communication interface, a command to activate video control based on a geographical condition;

acquiring position information of the vehicle;

determining whether the position information of the vehicle satisfies the geographical condition, wherein the geographical condition includes geographical area, and the determining whether the position information of the vehicle satisfies the geographical condition includes determining whether a position of the vehicle represented by the position information is within an area represented by the geographical area information;

in a case that the position information of the vehicle satisfies the geographical condition, storing a second video file in the a second storage area based on video captured by the camera and transmitting, to the external device, the second video file stored in the second storage area; and transmitting, to the external device, the first video file stored in the first storage area in a case that the position information of the vehicle does not satisfies the geographic condition.

7. The method according to claim 6, further comprising:

transmitting data related to the second video file stored in the second storage area in preference to data related to the first video file stored in the first storage area.

8. The method according to claim 6, further comprising:

automatically transmitting the second video file stored in the second storage area.

9. The method according to claim 6, further comprising:

capturing the video to be stored as the video files by the camera.

10. The method according to claim 6 further comprising:

storing the first video file of first quality in the first storage area; and in the case that the position information of the vehicle satisfies the geographical condition, storing the second video file of second quality different from the first quality in the second storage area.

11. A non-transitory computer readable medium storing a program comprising instructions for causing a computer, to execute processing of:

storing a first video file in a first storage area based on video captured by a camera mounted on a vehicle;

receiving, from the external device via the communication interface, a command to activate video control based on a geographical condition;

acquiring position information of the vehicle;

determining whether the position information of the vehicle satisfies the geographical condition, wherein the geographical condition includes geographical area, and the determining whether the position information of the vehicle satisfies the geographical condition includes determining whether a position of the vehicle represented by the position information is within an area represented by the geographical area information;

in a case that the position information of the vehicle satisfies the geographical condition, storing a second video file in a second storage area based on video captured by the camera and transmitting, to the external device, the second video file stored in the second storage area; and transmitting, to the external device, the first video file stored in the first storage area in a case that the position information of the vehicle does not satisfies the geographic condition.

12. The non-transitory computer readable medium according to claim 11, wherein the instructions further cause a computer to executing processing comprising:

transmitting data related to the second video file stored in the second storage area in preference to data related to the first video file stored in the first storage area.

13. The non-transitory computer readable medium according to claim 11, wherein the instructions further cause a computer to executing processing comprising:

automatically transmitting the second video file stored in the second storage area.

14. The non-transitory computer readable medium according to claim 11, wherein the instructions further cause a computer to executing processing comprising:

capturing the video to be stored as the video files by the camera.

15. The non-transitory computer readable medium according to claim 11 wherein the instructions further cause a computer to executing processing comprising:

storing the first video file of first quality in the first storage area; and in the case that the position information of the vehicle satisfies the geographical condition, storing the second video file of second quality different from the first quality in the second storage area.

* * * * *